United States Patent
Roh

(10) Patent No.: US 10,931,952 B2
(45) Date of Patent: Feb. 23, 2021

(54) MULTI-CODEC ENCODER AND MULTI-CODEC ENCODING SYSTEM INCLUDING THE SAME

(71) Applicant: SAMSUNG ELECTRONICS CO., LTD., Suwon-si (KR)

(72) Inventor: Sung Ho Roh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 97 days.

(21) Appl. No.: 15/980,276

(22) Filed: May 15, 2018

(65) Prior Publication Data

US 2019/0124333 A1    Apr. 25, 2019

(30) Foreign Application Priority Data

Oct. 19, 2017 (KR) .................. 10-2017-0135827

(51) Int. Cl.

| | |
|---|---|
| H04N 19/139 | (2014.01) |
| H04N 19/119 | (2014.01) |
| H04N 19/105 | (2014.01) |
| H04N 19/176 | (2014.01) |
| H04N 19/39 | (2014.01) |
| H04N 19/124 | (2014.01) |
| H04N 19/196 | (2014.01) |
| H04N 19/117 | (2014.01) |
| H04N 19/53 | (2014.01) |
| H04N 19/52 | (2014.01) |
| H04N 19/436 | (2014.01) |

(52) U.S. Cl.
CPC ......... *H04N 19/139* (2014.11); *H04N 19/105* (2014.11); *H04N 19/117* (2014.11); *H04N 19/119* (2014.11); *H04N 19/124* (2014.11); *H04N 19/176* (2014.11); *H04N 19/196* (2014.11); *H04N 19/39* (2014.11); *H04N 19/436* (2014.11); *H04N 19/52* (2014.11); *H04N 19/53* (2014.11)

(58) Field of Classification Search
CPC .. H04N 19/139; H04N 19/105; H04N 19/117; H04N 19/119; H04N 19/124; H04N 19/176; H04N 19/196; H04N 19/39; H04N 19/436; H04N 19/52; H04N 19/53
USPC ................................................ 375/240.03
See application file for complete search history.

(56) References Cited

U.S. PATENT DOCUMENTS

| | | | |
|---|---|---|---|
| 8,705,609 B2 | 4/2014 | Bae | |
| 9,247,264 B2 | 1/2016 | Franche et al. | |
| 9,571,833 B2 | 2/2017 | Bici et al. | |
| 9,674,532 B2 | 6/2017 | Kim et al. | |
| 2005/0002455 A1* | 1/2005 | Lin | H04N 5/145 |
| | | | 375/240.16 |

(Continued)

*Primary Examiner* — Matthew K Kwan

(74) *Attorney, Agent, or Firm* — Sughrue Mion, PLLC

(57) ABSTRACT

A multi-codec encoder includes a first partitioning unit and a second partitioning unit configured to receive first data and second data, respectively. Sequential frames of image data are alternately classified into the first data and the second data. The multi-codec encoder further includes a motion estimation module configured to generate motion estimation information, based on the first data and reference data, a first codec configured to encode the first data with the motion estimation information, and a second codec configured to encode the second data with the motion estimation information.

19 Claims, 17 Drawing Sheets

(56) References Cited

U.S. PATENT DOCUMENTS

| | | | |
|---|---|---|---|
| 2005/0074173 A1* | 4/2005 | Lee | H04N 1/411 |
| | | | 382/232 |
| 2006/0018381 A1* | 1/2006 | Luo | H04N 19/53 |
| | | | 375/240.16 |
| 2010/0086029 A1* | 4/2010 | Chen | H04N 19/176 |
| | | | 375/240.12 |
| 2010/0220787 A1* | 9/2010 | Yamasaki | H04N 19/51 |
| | | | 375/240.16 |
| 2012/0060196 A1* | 3/2012 | Chang | H04N 21/2181 |
| | | | 725/93 |
| 2013/0266289 A1* | 10/2013 | Oyman | H04W 76/16 |
| | | | 386/248 |
| 2014/0168362 A1 | 6/2014 | Hannuksela et al. | |
| 2014/0355677 A1* | 12/2014 | Kondo | H04N 19/136 |
| | | | 375/240.12 |
| 2015/0288979 A1 | 10/2015 | Dong | |
| 2015/0350652 A1 | 12/2015 | Nellore et al. | |
| 2016/0014411 A1* | 1/2016 | Sychev | H04N 19/56 |
| | | | 375/240.12 |
| 2016/0330470 A1 | 11/2016 | Jang et al. | |
| 2017/0013269 A1 | 1/2017 | Kim et al. | |
| 2017/0118466 A1 | 4/2017 | Nakagami | |

\* cited by examiner

MULTI-CODEC ENCODER AND MULTI-CODEC ENCODING SYSTEM INCLUDING THE SAME

CROSS-REFERENCE TO THE RELATED APPLICATION

This application claims priority from Korean Patent Application No. 10-2017-0135827 filed on Oct. 19, 2017, in the Korean Intellectual Property Office, the disclosure of which is incorporated herein by reference in its entirety.

BACKGROUND

1. Field

Apparatuses consistent with example embodiments relate to a multi-codec encoder and a multi-codec encoding system including the same.

2. Description of the Related Art

High-resolution and high-quality images such as high-definition (HD) images and high-definition (UHD) images are increasingly in demand. Accordingly, high-performance image compression techniques are being used to process high-resolution and high-quality images.

Recently, mobile devices such as a mobile phone and a smart phone have been widely used. In the mobile environments, mobile devices have small sizes and use batteries, which work as limitations. Accordingly, there are a variety of ongoing research to efficiently compress high-resolution and high-quality images in such mobile devices.

Lately, images are frequently encoded at a high frame rate in frame-per-second (fps). Existing encoders can perform encoding using a limited frame rate, and thus it is practically difficult to perform encoding at a high frame rate, using a single encoder.

By using a plurality of encoders, it is possible to encode an image at a high frame rate. However, when a plurality of encoders is used, there arises a problem that the size of the encoding device becomes large, and thus the size of the device incorporating the encoding device becomes large.

Likewise, to encode high-resolution images, it is difficult to maintain a high speed by using a single encoder and thus a plurality of encoders may be used. Also in this case, there is a problem that the size of the device incorporating the encoding device becomes large.

SUMMARY

According to example embodiments, there is provided a multi-codec encoder including a first partitioning unit and a second partitioning unit configured to receive first data and second data, respectively. Sequential frames of image data are alternately classified into the first data and the second data. The multi-codec encoder further includes a motion estimation module configured to generate motion estimation information, based on the first data and reference data, a first codec configured to encode the first data with the motion estimation information, and a second codec configured to encode the second data with the motion estimation information.

According to example embodiments, there is provided a multi-codec encoding system a pre-processor circuit configured to alternately classify sequential frames of image data into first data and second data, and a multi-codec encoder configured to receive the first data and the second data, and including a motion estimation module configured to generate motion estimation information, based on the first data and reference data, a first codec configured to encode the first data with the motion estimation information, and a second codec configured to encode the second data with the motion estimation information.

According to example embodiments, there is provided a multi-codec encoder including a first partitioning unit and a second partitioning unit configured to receive first data and second data, respectively. Sequential frames of image data are alternately classified into the first data and the second data. The multi-codec encoder further includes a motion estimation module configured to generate first motion estimation information, based on the first data and reference data, and generate second motion estimation information, based on the second data and the reference data. Each of the first motion estimation information and the second motion estimation information is generated using only half of a single frame of a respective one of the first data and the second data. The multi-codec encoder further includes a memory configured to store the first motion estimation information and the second motion estimation information, a first codec configured to encode the first data with the first motion estimation information, and a second codec configured to encode the second data with the second motion estimation information.

According to example embodiments, there is provided a multi-codec encoder including a multi-codec encoder including a first partitioning unit and a second partitioning unit configured to receive first data and second data, respectively. Sequential frames of image data are alternately classified into the first data and the second data. The multi-codec encoder further includes a motion estimation module configured to receive the image data, generate first motion estimation information, based on the image data and reference data, and generate second motion estimation information, based on the image data and the reference data. Each of the first motion estimation information and the second motion estimation information is generated using only half of a single frame of a respective one of the first data and the second data. The multi-codec encoder further includes a memory configured to store the first motion estimation information and the second motion estimation information, a first codec configured to encode the first data with the first motion estimation information, and a second codec configured to encode the second data with the second motion estimation information.

DETAILED DESCRIPTION OF THE EXAMPLE EMBODIMENTS

Example embodiments provide a multi-codec encoder that encodes images by using a plurality of encoders, while reducing the space occupied by the plurality of encoders.

Example embodiments provide a multi-codec encoding system including a multi-codec encoder that encodes images by using a plurality of encoders, while reducing the space occupied by the plurality of encoders.

Figure 1:
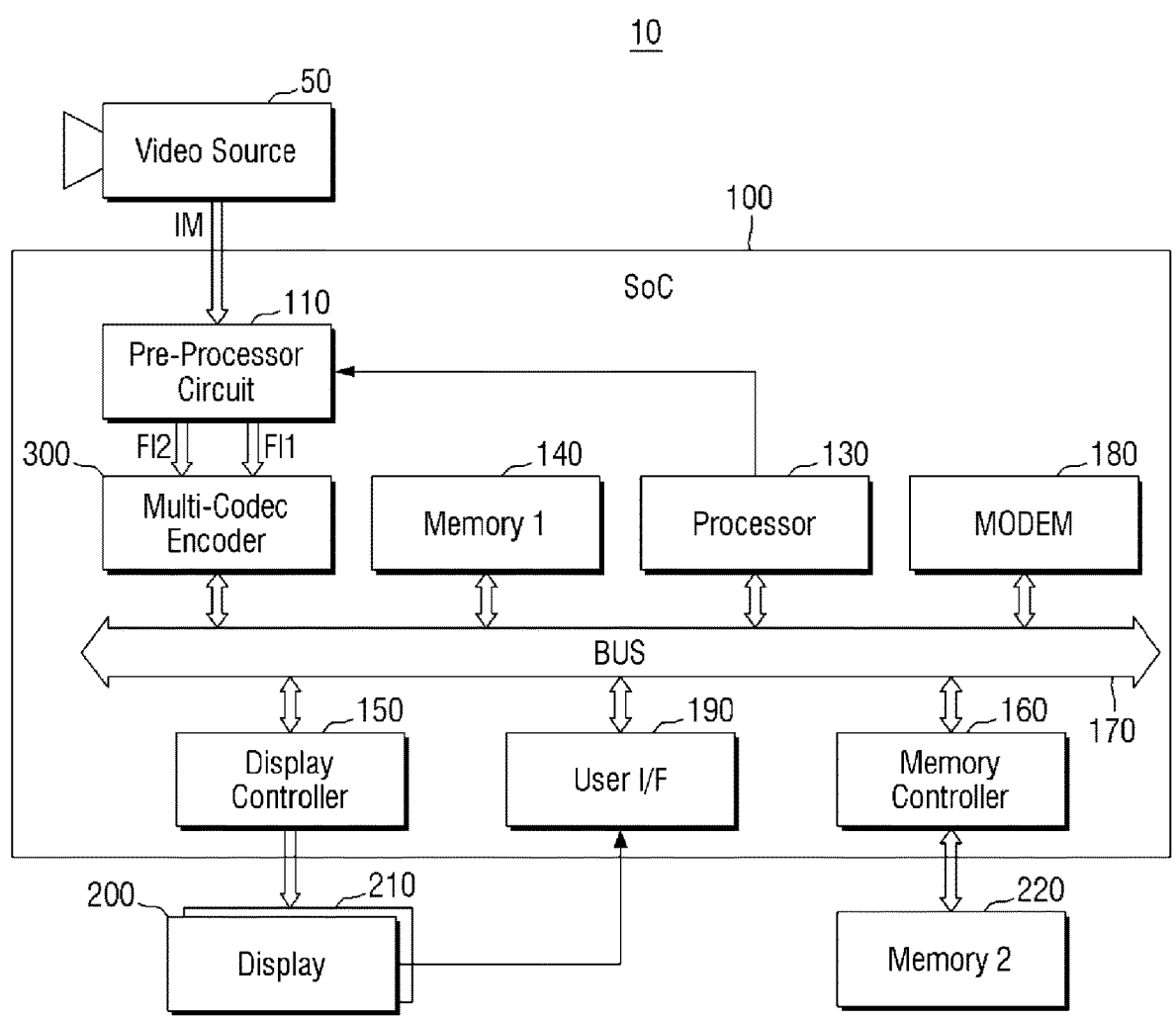
FIG. 1 is a block diagram of a multi-codec encoding system according to example embodiments.

FIG. 1 is a block diagram of a multi-codec encoding system according to example embodiments.

Referring to FIG. 1, a first multi-codec encoding system 10 may be a variety of devices that can capture an image to process it as data and display, store or transmit the processed data.

For example, the first multi-codec encoding system 10 may be implemented as any one or any combination of a TV, a DTV (digital TV), an IPTV (internet protocol TV), a PC (personal computer), a desktop computer, a lap-top computer, a computer workstation, a tablet PC, a video game platform (or a video game console), a server, and a mobile computing device. The mobile computing device may be implemented as any one or any combination of a mobile phone, a smart phone, an enterprise digital assistant (EDA), a digital still camera, a digital video camera, a portable multimedia player (PMP), a personal navigation device or a portable navigation device (PND), a mobile internet device (MID), a wearable computer, an internet of things (JOT) device, an internet of everything (JOE), and an e-book.

The first multi-codec encoding system 10 may include a video source 50, a first multi-codec encoding device 100, a display 200, an input device 210 and a second memory 220.

The elements shown in FIG. 1 are not essential for implementing the first multi-codec encoding system 10. Additional elements may be added or some of the listed elements may be eliminated.

The first multi-codec encoding device 100 may be implemented as a system-on-chip (SoC).

The video source 50 may be implemented, for example, as a camera equipped with a charge-coupled device (CCD) or a complementary metal-oxide-semiconductor (CMOS) image sensor.

The video source 50 may capture an object, generate image data IM for the object, and provide the generated image data IM to the first multi-codec encoding device 100.

The image data IM may be still image data or video data. In example embodiments, the video source 50 may alternatively be included in a host HOST. The image data IM may be image data provided from the host.

The first multi-codec encoding device 100 may control the overall operation of the first multi-codec encoding system 10.

For example, the first multi-codec encoding device 100 may include an integrated circuit (IC), a motherboard, an application processor (AP), and/or a mobile AP that can perform operations according to example embodiments.

The first multi-codec encoding device 100 may process the image data IM output from the video source 50 and may display the processed data on the display 200, store the processed data in the second memory 220 or transmit it to another data processing system.

The first multi-codec encoding device 100 may include a first pre-processor circuit 110, a first multi-codec encoder 300, a processor 130, a first memory 140, a display controller 150, a memory controller 160, a bus 170, a modem 180, and a user interface 190 (user I/F).

It is to be noted that the above-described elements are not essential for implementing the first multi-codec encoding device 100. Additional elements may be added or some of the listed elements may be eliminated.

The first multi-codec encoder 300, the processor 130, the first memory 140, the display controller 150, the memory controller 160, the modem 180 and the user interface 190 may transmit/receive data to/from one another via the bus 170.

For example, the bus 170 may be implemented as, but is not limited to, one of a peripheral component interconnect (PCI) bus, a PCI express (PCIe) bus, an advanced high performance bus (AMBA), an advanced high performance (AHB) bus, advanced peripheral bus (APB), advanced extensible interface (AXI) bus, and a combination thereof.

The first pre-processor circuit 110 may include, for example, an image signal processor (ISP). The ISP may convert the image data IM having a first data format into first data FI1 and second data FI2.

For example, the image data IM may be data having a Bayer pattern, and the first data FI1 and the second data FI2 may be YUV data.

The first pre-processor circuit 110 may receive the image data IM output from the video source 50. The first pre-processor circuit 110 may process the received image data IM and may provide the first data FI1 and the second data FI2 thus generated to the first multi-codec encoder 300.

Figure 2:
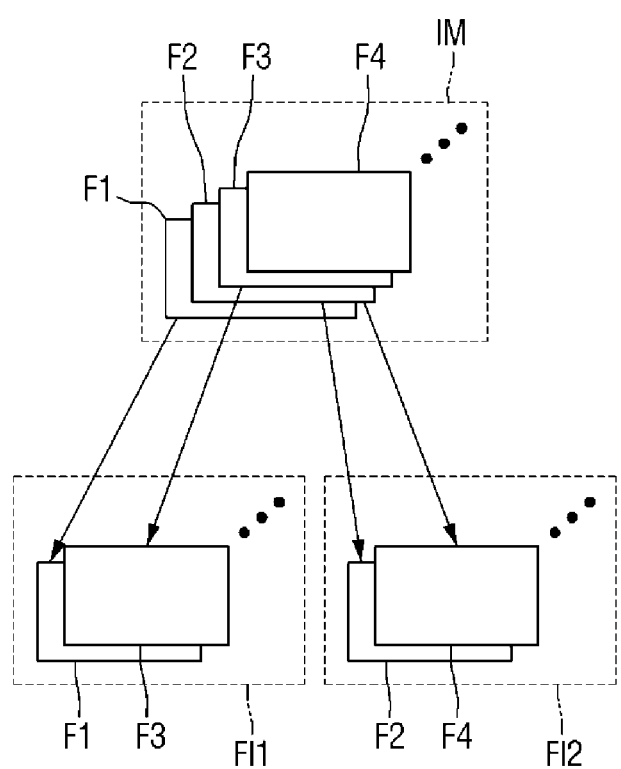
FIG. 2 is a diagram for conceptually illustrating classification of image data input to the multi-codec encoding system of FIG. 1.

In the environment where the first multi-codec encoding device 100 is driven, the image data IM, the first data FI1 and the second data FI2 may be provided in the form of frames (or pictures), for example FIG. 2 is a diagram for conceptually illustrating classification of image data input to the multi-codec encoding system of FIG. 1.

Referring to FIG. 2, for example, the image data IM may be a set of data including a plurality of frame data F1, F2, F3, and F4. The second frame F2 may come next to the first frame F1. The third frame F3 may come next to the second frame F2. The fourth frame F4 may come next to the third frame F3.

The first data FI1 transmitted to the first multi-codec encoder 300 may be a data group including data for odd-numbered frames F1 and F3. The second data FI2 transmitted to the first multi-codec encoder 300 may be a data group including data for odd-numbered frames F2 and F4. In a subsequent process, the first data FI1 may be transmitted to a first codec 320 of FIG. 3, and the second data FI2 may be transmitted to a second codec 330 of FIG. 3.

Although the first pre-processing circuit 110 is depicted in FIG. 1 as being implemented in the first multi-codec encoding device 100, this is illustrative. In other implementations, the first pre-processor circuit 110 of the multi-codec encoding system may be implemented outside the first multi-codec encoding device 100.

Referring to FIGS. 1 and 2, the first multi-codec encoder 300 may perform the encoding on the odd-numbered frames (e.g., the first frame F1 and the third frame F3) separately from the encoding on the even-numbered frames (e.g., the second frame F2 and the fourth frame F4). A detailed description thereon will be given later.

The encoding operations may be carried out using a video data encoding technique such as a JPEG (Joint Picture Expert Group), MPEG (Motion Picture Expert Groups), MPEG-2, MPEG-4, VC-1, H.264, H. 265 and HEVC (High Efficiency Video Coding). It is, however, to be understood that the above listed standards are illustrative.

The processor 130 may control the operation of the first multi-codec encoding device 100.

Processor 130 may receive a user input to execute one or more applications (e.g., software applications).

Some of the applications executed by the processor 130 may be video call applications. In addition, the applications executed by the processor 130 may include, but is not limited to, an operating system (OS), a word processor application, a media player application, a video game application, and/or a graphical user interface (GUI) application.

The processor 130 may control the first pre-processor circuit 110 so that it allocates the odd-numbered frames F1 and F3 and the even-numbered frames F2 and F4 separately to the first multi-codec encoder 300. In other words, the processor 130 may determine whether a frame is classified into the first data FI1 or the second data FI2.

It is to be noted that the processor 130 may classify the first data FI1 and the second data FI2 in various ways. For example, the processor 130 may allocate the even-numbered frames F2 and F4 to the first data FI1 and the odd-numbered frames F1 and F3 to the second data FI2.

The first memory 140 may transmit information on the frames that are currently being encoded by the first multi-codec encoder 300 in the first data FI1 and the second data FI2 to the first multi-codec encoder 300 under the control of the memory controller 160.

Figure 3:
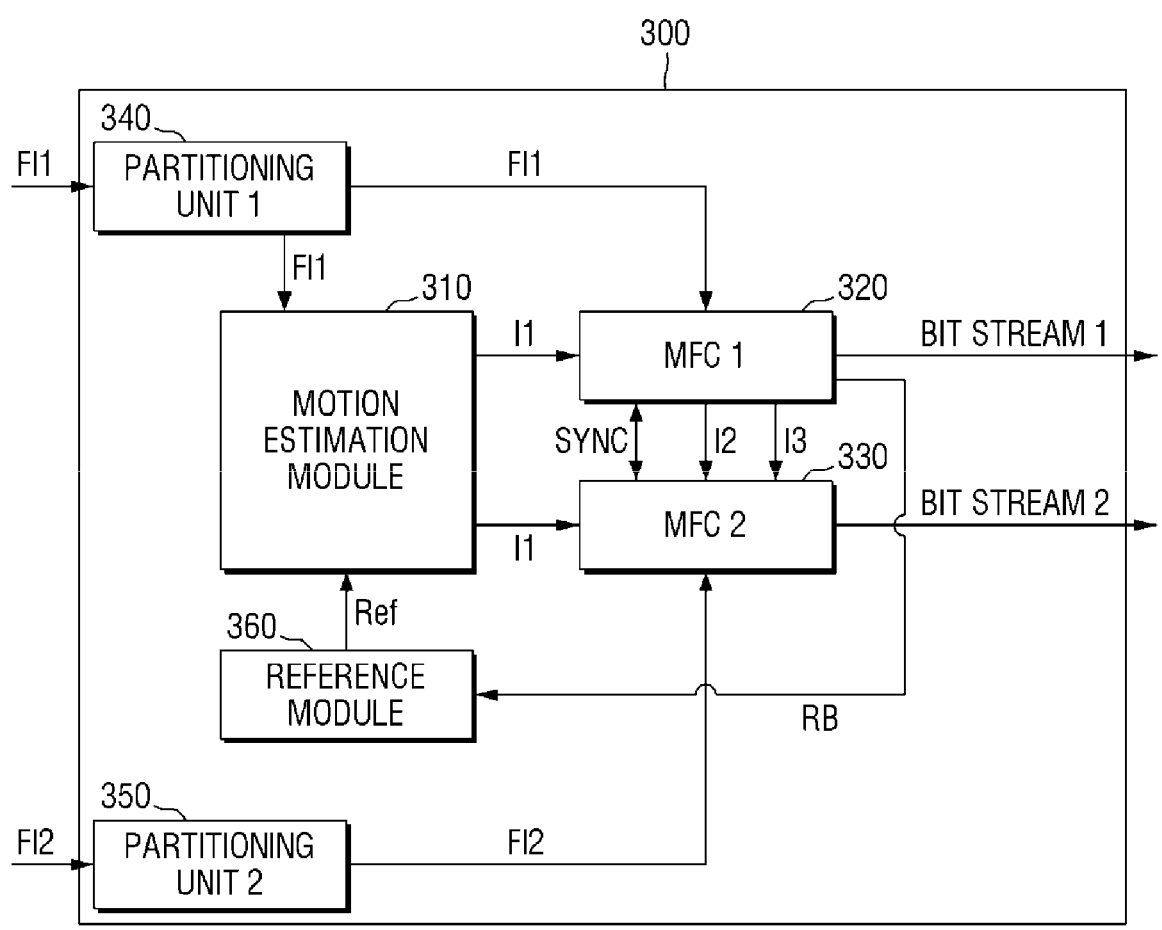
FIG. 3 is a block diagram for illustrating a multi-codec encoder of FIG. 1 in detail.

The memory controller 160 may write to the second memory 220 the data encoded by the first multi-codec encoder 300 or the data output from the processor 130 (e.g., a first bit stream BIT STEAM 1 and a second bit stream BIT STEAM 2 shown in FIG. 3) under the control of the first multi-codec encoder 300 or the processor 130

The first memory 140 may be implemented as a volatile memory such as a static random access memory (SRAM). The volatile memory may be implemented as one of a random access memory (RAM), a static RAM (SRAM), a dynamic RAM (DRAM), a synchronous DRAM (SDRAM), a thyristor RAM (T-RAM), a zero capacitor RAM (Z-RAM) and a twin transistor RAM (TTRAM). However, this is illustrative. In other implementations, the first memory 140 may be implemented as a non-volatile memory.

The second memory 220 may be implemented as a non-volatile memory. The non-volatile memory may be implemented as one of an electrically erasable programmable read-only memory (EEPROM), a flash memory, a magnetic RAM (MRAM), a spin-transfer torque MRAM, a ferroelectric RAM (FeRAM), a phase change RAM (PRAM) and a resistive RAM (RRAM). In addition, the non-volatile memory may also be implemented as one of a multimedia card (MMC), an embedded MMC (eMMC), a universal flash storage (UFS), a solid-state drive or disk (SSD), a USB flash drive and a hard disk drive (HDD). It is, however, to be understood that this is illustrative. In other implementations, the second memory 220 may be implemented as a volatile memory.

Although the second memory 220 is depicted in FIG. 1 as being located outside the first multi-codec encoding device 100, this is illustrative. In other implementations, the second memory 220 may be implemented in the first multi-codec encoding device 100.

The display controller 150 may transmit the data output from the first multi-codec encoder 300 or the processor 130 to the display 200. The display 200 may be implemented as one of a monitor, a TV monitor, a projection device, a thin-film transistor liquid-crystal display (TFT-LCD), a light-emitting diode (LED) display, an organic LED (OLED) display, an active-matrix OLED (AMOLED) display, and a flexible display.

For example, the display controller 150 may transmit data to the display 200 via a MIPI display serial interface (DSI).

The input device 210 may receive a user input from a user and may transmit an input signal to the user interface 190 in response to the user input.

The input device 210 may be implemented as, but is not limited to, one of a touch panel, a touch screen, a voice recognizer, a touch pen, a keyboard, a mouse, a track point, etc. For example, when the input device 210 is a touch screen, the input device 210 may include a touch panel and a touch panel controller. The input device 210 may be connected to the display 200 and may be implemented as a device separated from the display 200.

The input device 210 may transmit an input signal to the user interface 190.

The user interface 190 may receive an input signal from the input device 210 and may transmit data generated by the input signal to the processor 130.

The modem 180 may output the data encoded by the first multi-codec encoder 300 or the processor 130 to an external device, using a wireless communications technique. The modem 180 may employ, but is not limited to, any one or any combination of technologies including Wi-Fi, WIBRO, 3G wireless communications, the long term evolution (LTE™), the long term evolution-advanced (LTE-A), and the broadband LTE-A.

FIG. 3 is a block diagram for illustrating the multi-codec encoder of FIG. 1 in detail.

Referring to FIG. 3, the first multi-codec encoder 300 may include a first partitioning unit 340, a second partitioning unit 350, a motion estimation module 310, a first codec 320 (MFC 1), a second codec 330 (MFC 2) and a reference module 360.

The elements shown in FIG. 2 are not essential for implementing the first multi-codec encoder 300. Additional elements may be added or some of the listed elements may be eliminated.

The first partitioning unit 340 may divide a frame included in the first data FI1, which is to be currently encoded, (e.g., the first frame F1 shown in FIG. 2) into a plurality of blocks. Likewise, the second partitioning unit 350 may divide a frame included in the second data FI2, which is to be currently encoded, (e.g., the first frame F2 shown in FIG. 2) into a plurality of blocks.

The first partitioning unit 340 may transmit the first data FI1 to the motion estimation module 310 and the first codec 320. The second partitioning unit 350 may transmit the second data FI2 to the second codec 330. The second partitioning unit 350 may not transmit the second data FI2 to the motion estimation module 310.

The motion estimation module 310 and the first codec 320 may perform intra-prediction or inter-prediction on a frame of the first data FI1, e.g., the first frame F1.

The intra-prediction is carried out without referring to any other frame than the current frame that is being encoded. The inter-prediction is carried out by referring to other frames than the current frame that is being encoded.

Similarly, the motion estimation module 310 and the second codec 330 may perform inter-prediction on a frame of the second data FI2, e.g., the second frame F2. It is to be noted that the second codec 330 cannot perform intra-prediction and can perform inter-prediction only, unlike the first codec 320.

The first codec 320 and the second codec 330 may be multi-format codecs (MFCs).

The motion estimation module 310 may divide the currently encoded frame into an appropriate number of blocks having an appropriate size so that distortion is suppressed and the number of bits is smallest. The motion estimation module 310 may select a mode having the least distortion and the smallest number of bits from various modes of motion estimation (e.g., a normal mode, a merge mode, etc.). The motion estimation module 310 may search the reference data Ref stored in the reference module 360 for the block best matched to the block input to the motion estimation module 310 to thereby obtain a motion vector.

The motion estimation module 310 may generate first motion estimation information I1, using the first data FI1 and the reference data Ref. The first motion estimation information I1 may contain the motion vector.

The motion estimation module 310 may transmit the first motion estimation information I1 to the first codec 320 and the second codec 330. Although the first codec 320 performs encoding on the first data FI1 while the second codec 330 performs encoding on the second data FI2, the motion estimation module 310 may transmit the same first motion estimation information I1 to the first codec 320 and the second codec 330. This is because there is no a significant difference whether the motion estimation information such as a motion vector is obtained based on the first frame F1 or the second frame F2 next to the first frame F1 for the image data IM at a high frame rate.

In this manner, the first codec 320 and the second codec 330 may share the single motion estimation module 310 to perform the encoding. The size of the motion estimation module 310 may be larger than any other modules in an encoder. Accordingly, by sharing the motion estimation module 310, the overall size of the device can be reduced while the encoding speed can be improved.

The first codec 320 and the second codec 330 may be synchronized with each other. That is, signals may be input/output to/from the first codec 320 and the second codec 330 simultaneously by a synchronization signal SYNC.

The first codec 320 may transmit intra-prediction information 12 to the second codec 330. The first codec 320 performs both intra-prediction and inter-prediction, whereas the second codec 330 can perform inter-prediction only. Therefore, there is no intra-prediction information 12 in the second codec 330, and the second codec 330 may receive the intra-prediction information 12 from the first codec 320.

The first codec 320 may transmit first quantization parameter data 13 to the second codec 330. The first codec 320 may generate the first quantization parameter data 13 for rate control. On the other hand, the second codec 330 may not be able to perform rate control on its own. Accordingly, the second codec 330 may receive the first quantization parameter data 13 from the first codec 320. The first quantization parameter data 13 will be described in detail below.

Figure 4:
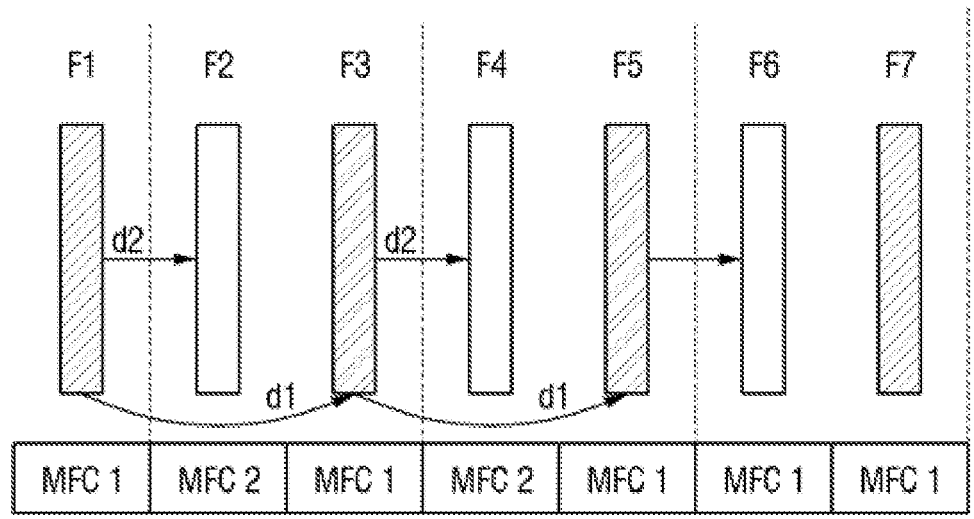
FIG. 4 is a diagram for conceptually illustrating a non-hierarchical encoding by first and second codecs of FIG. 3.

FIG. 4 is a diagram for conceptually illustrating a non-hierarchical encoding by the first and second codecs of FIG. 3.

Referring to FIG. 4, the first codec 320 and the second codec 330 may perform non-hierarchical encoding.

The first frame F1 may be encoded using intra-prediction because the reference data Ref is not yet created. The third frame F3 may be encoded using inter-prediction by the first codec 320, with the first frame F1 as reference data Ref. The third frame F3 may be encoded using the first motion estimation information I1.

The second frame F2 may be encoded by inter-prediction by the second codec 330. At this time, the second codec 330 may encode the second frame F2, using the first motion estimation information I1. As mentioned earlier, for the image data IM at a high frame rate, there is no a significant difference whether the motion estimation information such as a motion vector is obtained based on the first frame F1 or the second frame F2 next to the first frame F1, it is possible to perform encoding using the inter-prediction.

In this manner, the first codec 320 may encode the odd-numbered frames F1, F3, F5 and F7. In doing so, the first frame F1 and the seventh frame F7 may be encoded by intra-prediction, while the third frame F3 and the fifth frame F5 may be encoded by inter-prediction. The third frame F3 and the fifth frame F5 may be stored as reference data Ref.

The second codec 330 may encode the even-numbered frames F2 and F4. In doing so, the second frame F2 may be encoded using inter-prediction by using the first motion estimation information Ti on the third frame F3, while the fourth frame F4 may be encoded by using the first motion estimation information I1 on the fifth frame F5.

Even though the sixth frame F6 is an even-numbered frame, the motion estimation information on the seventh frame F7 cannot be used because it is immediately before the seventh frame F7 that is encoded by intra-prediction. In this case, the sixth frame F6 may also be encoded using inter-prediction by the first codec 320. To this end, the first pre-processor circuit 110 may classify the sixth frame F6 as the first data FI1 in advance.

Figure 5:
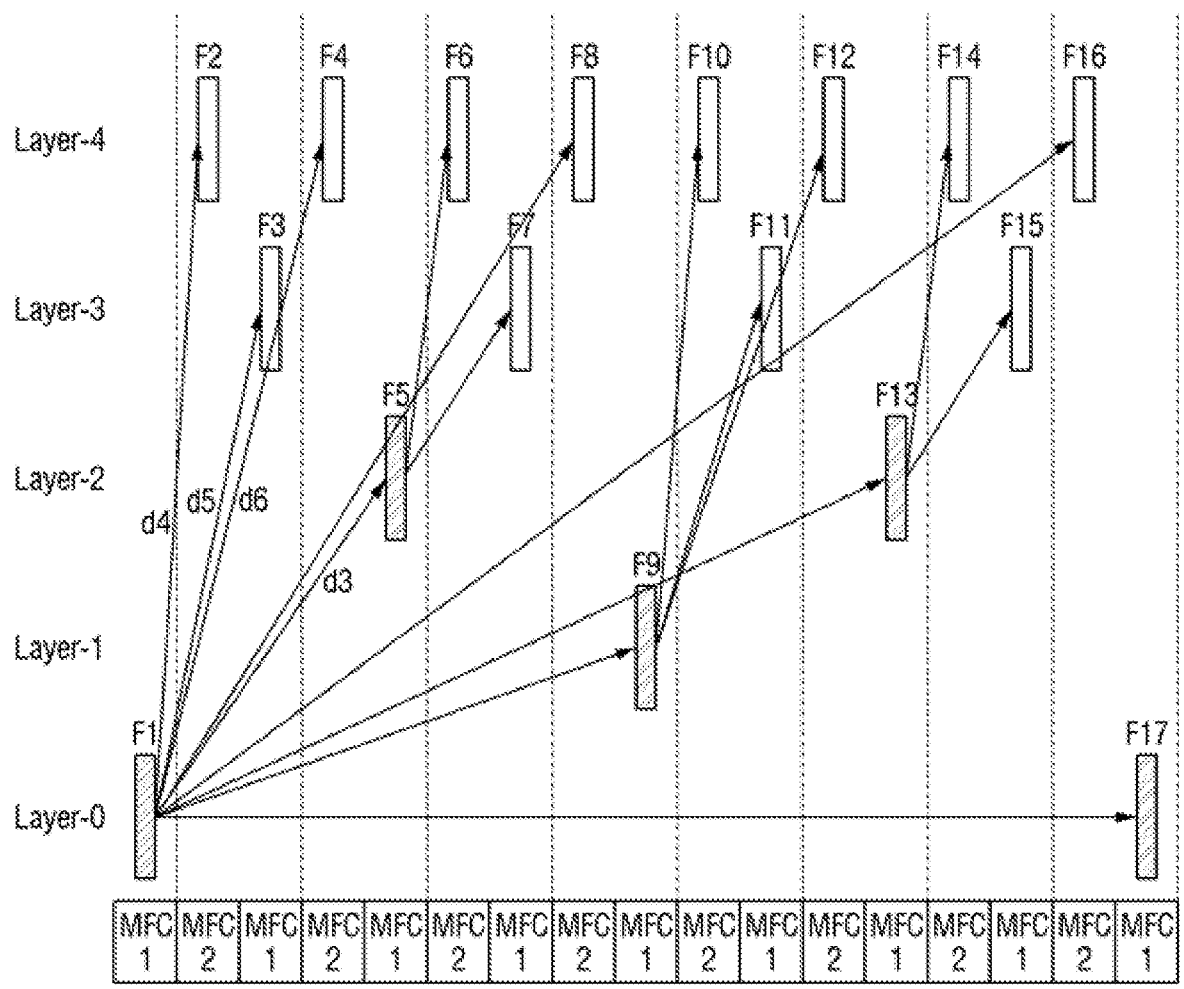
FIG. 5 is a diagram for conceptually illustrating hierarchical encoding by the first and second codecs of FIG. 3.

FIG. 5 is a diagram for conceptually illustrating hierarchical encoding by the first and second codecs of FIG. 3.

Referring to FIG. 5, the first codec 320 and the second codec 330 may perform hierarchical encoding. FIG. 5 shows an example of the hierarchical encoding, i.e., 5-layer encoding. In other implementations, the multi-codec encoding system may employ a 7-layer encoding scheme.

Also in the hierarchical encoding, the first codec 320 and the second codec 330 may alternately perform encoding on consecutive frames. By doing so, the multi-codec encoding system according to example embodiments can perform encoding at an improved rate and higher efficiency by using the single motion estimation module 310 and two codecs.

Referring to FIGS. 3, 4 and 5, the second codec 330 may use the first motion estimation information I1 by scaling it. That is, when the motion vector of the third frame F3 is obtained by using the first frame F1 as the reference data Ref, a first temporal distance d1 between the first frame F1 and the third frame F3 may be twice a second temporal distance d2 between the first frame F1 and the second frame F2.

Therefore, the second codec 330 may perform encoding using inter-prediction by scaling the size of the motion vector of the first motion estimation information I1 on the third frame F3 to ½.

Likewise, the second codec 330 may perform encoding using inter prediction by scaling the size of the motion vector of the first motion estimation information I1 on the fifth frame F5 to ½.

In FIG. 5, the scaling ratio of the fourth distance d4 may be ¼, the scaling ratio of the fifth distance d5 may be ½, and the scaling ratio of the sixth distance d6 may be ¾, as compared with the third distance d3. By doing so, the second codec 330 may perform encoding on the fourth frame F4 by scaling the size of the motion vector of the first motion estimation information I1 on the fifth frame F5 to ¾. It is to be understood that the scaling values are not limited to the above numerical values.

Figure 6:
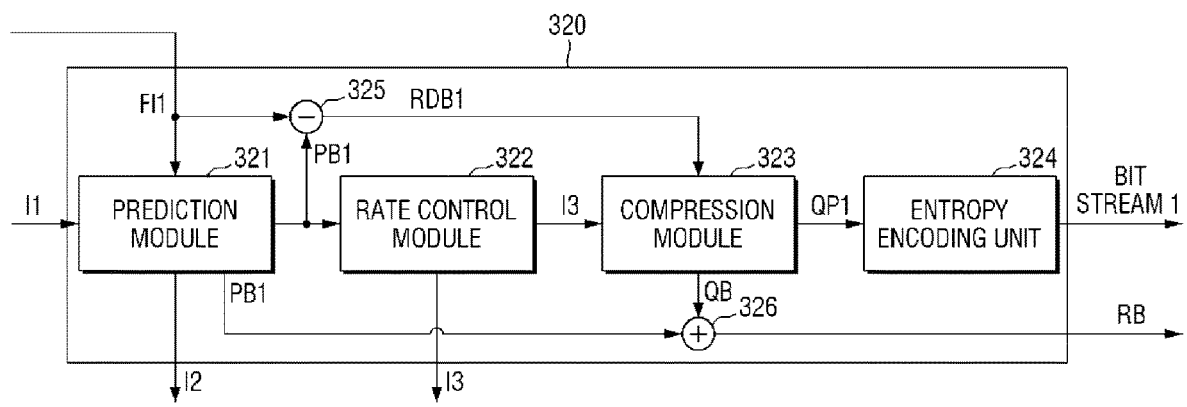
FIG. 6 is a block diagram for illustrating the first codec of FIG. 3 in detail.

FIG. 6 is a block diagram for illustrating the first codec of FIG. 3 in detail.

Referring to FIG. 6, the first codec 320 may include a first prediction module 321, a first rate control module 322, a first compression module 323, a first subtractor 325, a first adder 326, and a first entropy encoding unit 324.

The first prediction module 321 may receive the first data FI1 and the first motion estimation information I1. The first prediction module 321 may perform intra-prediction or inter-prediction to generate a first prediction block PB1. The first prediction module 321 may transmit the intra-prediction information I2 to the second codec 330.

The intra-prediction information I2 may include any one or any combination of information on blocks on which intra-prediction has been performed (e.g., information on the size and number of blocks on which the intra-prediction has been performed), information on a mode used in intra-prediction, and information on the reference block.

The first subtractor 325 may obtain a difference between the current block that is being encoded among the first data FI1 and the first prediction block PB1 generated in the first prediction module 321 to thereby generate a first residual block RDB1. The first residual block RDB1 may indicate the difference between the currently encoded block among the first data FI1 and the first prediction block PB1.

The first rate control module 322 may adjust the quantization parameters of each of the plurality of blocks included in the current frame by using the first prediction block PB1. That is, the first rate control module 322 may generate the first quantization parameter data I3. The first rate control module 322 may transmit the first quantization parameter data I3 to the second codec 330.

The first compression module 323 may generate a first quantization coefficient QP1 by using the first quantization parameter data I3 and the first residual block RDB1. In addition, the first compression module 323 may generate an inverse quantization block QB by inverse-quantizing and inverse-transforming the first quantization coefficient QP1.

The first adder 326 may add the first prediction block PB1 to the inverse quantization block QB to generate a reconstruction block RB.

The first entropy encoding unit 324 may perform entropy-encoding on a symbol, according to a probability distribution based on the first quantization coefficient QP1, to output a first bitstream BIT STREAM 1. The entropy encoding refers to a method of receiving symbols having various values and expressing them as a decodable binary string while eliminating statistical redundancy.

Herein, the symbol may refer to a syntax element to be encoded, a coding parameter, a residual block, and the like. The encoding parameter is for encoding and decoding, and may include information that is encoded in the encoding device and transmitted to the decoding device, such as a syntax element, as well as information that can be inferred during the encoding or decoding process. It may be information for encoding or decoding images.

The encoding parameters may include, for example, values or statistics such as intra-/inter-prediction, a motion vector, a reference data index, an encoding block pattern, information indicating whether there is a residual block, a transform coefficient, a quantized transform coefficient, a quantization coefficient, a block size, and information on divided blocks.

By employing the entropy encoding, a smaller number of bits are allocated to a symbol having a higher generation probability, while a larger number of bits are allocated to a symbol having a lower generation probability, thereby reducing the size of bit streams for symbols to be encoded. As a result, the compression efficiency of the image coding can be increased by using the entropy encoding.

Encoding schemes such as exponential golomb, context-adaptive variable length coding (CAVLC) and context-adaptive binary arithmetic coding (CABAC) may be used for the entropy encoding. For example, the first entropy encoding unit 324 may store therein a table for performing entropy encoding such as a variable length coding/code (VLC) table. The first entropy encoding unit 324 may perform the entropy encoding by using the variable length coding (VLC) table stored therein. In addition, the first entropy encoding unit 324 may derive a binarization method of a target symbol and a probability model of the target symbol/bin and then may perform the entropy encoding by using the derived binarization method or probability model.

Figure 7:
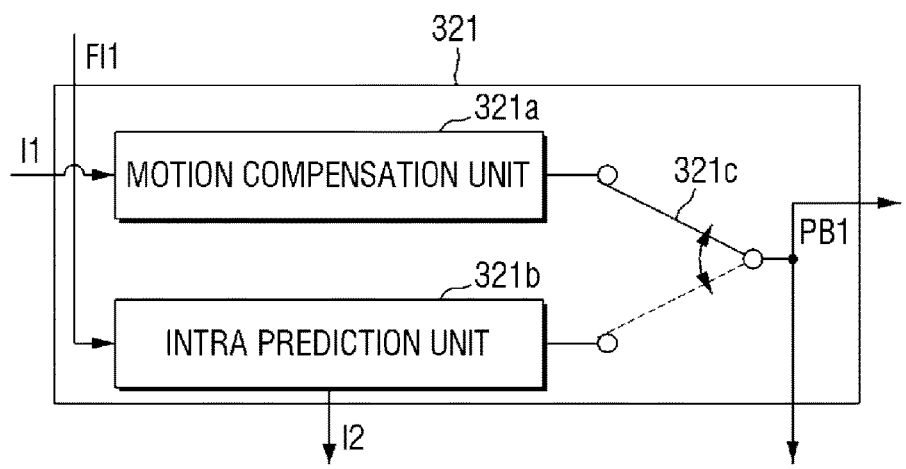
FIG. 7 is a block diagram for illustrating a first prediction module of FIG. 6 in detail.

FIG. 7 is a block diagram for illustrating the first prediction module of FIG. 6 in detail.

Referring to FIG. 7, the first prediction module 321 includes a motion compensation unit 321a, an intra-prediction unit 321b, and a switch 321c.

The motion compensation unit 321a performs motion compensation by using the first motion estimation information I1 such as a motion vector generated by the motion estimation module 310 and the reference data Ref stored in the reference module 360, to thereby generate the first prediction block PB1.

The intra-prediction unit 321b may divide the currently encoded frame into an appropriate number of blocks having an appropriate size so that distortion is suppressed and the number of bits is smallest. The intra-prediction unit 321b may select a mode having the least distortion and the smallest number of bits from various modes of intra-prediction (e.g., a DC mode, a PLANAR mode, etc.).

The intra-prediction module 321b may generate a first prediction block PB1 by performing spatial prediction by using the pixel value of the already encoded block around the currently encoded block of the first data FI1.

The first prediction module 321 may perform both the intra-prediction and the inter-prediction, and then may determine whether to perform intra-prediction or inter-prediction, based on a cost value J calculated by Equation 1 below:

$$J=D+A*R \quad \text{[Equation 1]}$$

D denotes a distortion index of the encoded image, A denotes a constant value proportional to a quantization parameter value, and R denotes the number of bits generated by using intra-prediction or inter-prediction.

If the first prediction module 321 determines that it is appropriate to perform inter-prediction, based on the cost value J, inter-prediction may be performed by using the switch 321c. If the first prediction module 321 determines that it is appropriate to perform intra-prediction, based on the cost value J, intra-prediction may be performed by using the switch 321c.

Figure 8:
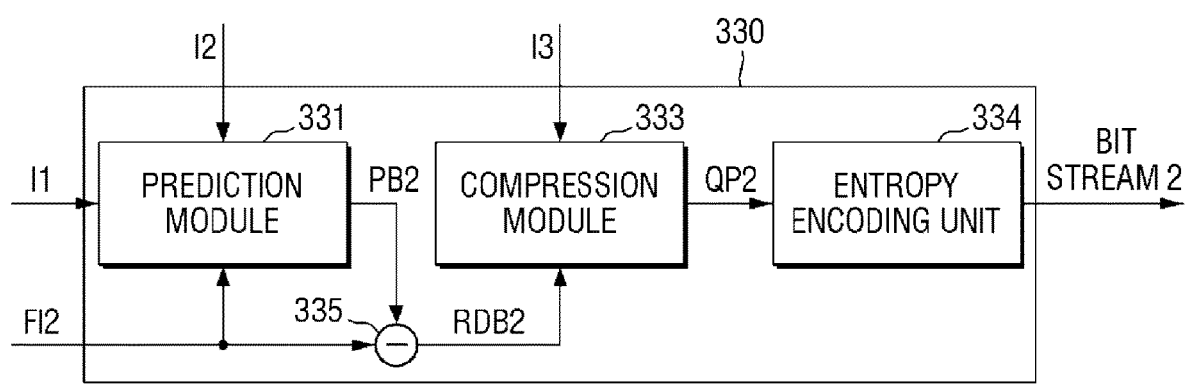
FIG. 8 is a block diagram for illustrating the second codec of FIG. 3 in detail.

FIG. 8 is a block diagram for illustrating the second codec of FIG. 3 in detail.

Referring to FIG. 8, the second codec 330 may include a second prediction module 331, a second compression module 333, a second subtractor 335, and a second entropy encoding unit 334.

The second prediction module 331 may receive the second data FI2 and the first motion estimation information I1. The second prediction module 331 may perform inter-prediction to generate a second prediction block PB2. The second prediction module 331 may receive the intra-prediction information I2.

The second subtractor 335 may obtain a difference between the current block that is being encoded among the second data FI2 and the second prediction block PB2 generated in the second prediction module 331 to thereby generate a second residual block RDB2. The second residual block RDB2 may indicate the difference between the currently encoded block among the second data FI2 and the second prediction block PB2.

The second compression module 333 may generate a second quantization coefficient QP2 by using the second quantization parameter data I3 and the second residual block RDB2.

The second entropy encoding unit 334 may perform entropy-encoding on a symbol, according to a probability distribution based on the second quantization coefficient QP2, to output a second bitstream BIT STREAM 2.

Figure 9:
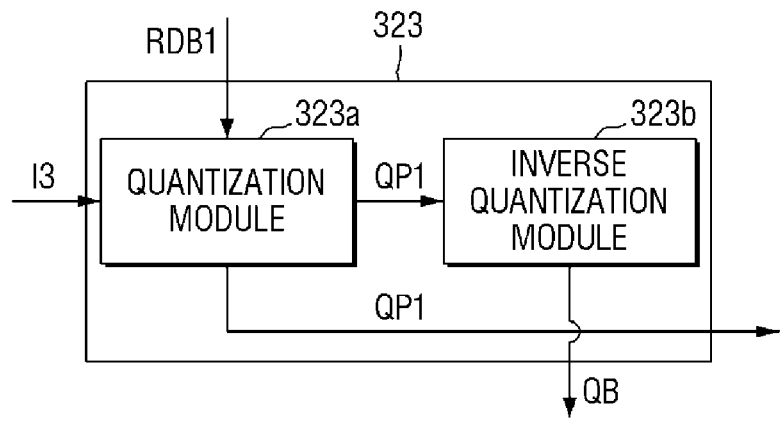
FIG. 9 is a block diagram for illustrating a first compression module of FIG. 6 in detail.

FIG. 9 is a block diagram for illustrating the first compression module of FIG. 6 in detail.

Referring to FIG. 9, the first compression module 323 may include a quantization module 323a and an inverse quantization module 323b.

The quantization module 323a may receive the first residual block RDB1 and the first quantization parameter data I3 to generate the first quantization coefficient QP1.

The inverse quantization module 323b may receive the first quantization coefficient QP1 to generate an inverse quantization block QB.

Figure 10:
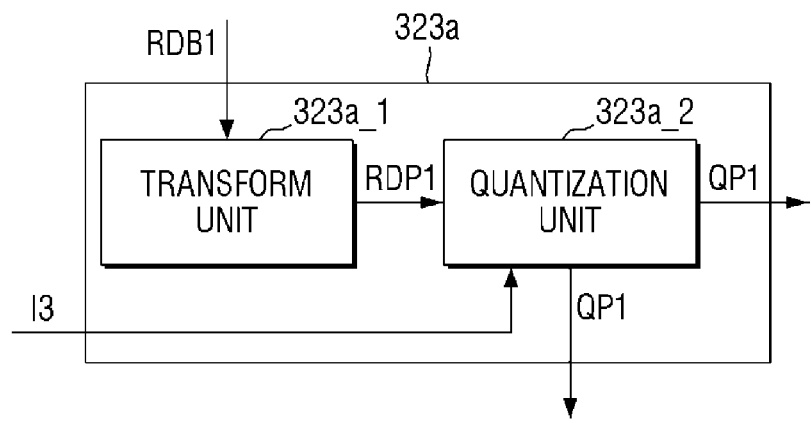
FIG. 10 is a block diagram for illustrating a quantization module of FIG. 9 in detail.

FIG. 10 is a block diagram for illustrating the quantization module of FIG. 9 in detail.

Referring to FIG. 10, the quantization module 323a may include a first transform unit 323a_1 and a first quantization unit 323a_2.

The first transform unit 323a_1 may create the transformed block data from the first residual block RDB1. The first transform unit 323a_1 may use discrete cosine transform (DCT) or wavelet transform. A first transform coefficient RDP1 generated in the first transform unit 323a_1 may be transmitted to the first quantization unit 323a_2.

The first quantization unit 323a_2 may quantize the first transform coefficient RDP1, according to the first quantization parameter data I3 determined by the first rate control module 322, and may output the first quantization coefficient QP1. The first quantization unit 323a_2 may quantize the first transform coefficient RDP1 to reduce the number of bits. In doing so, the first rate control module 322 may modify the degree of quantization by adjusting the first quantization parameter data I3.

Figure 11:
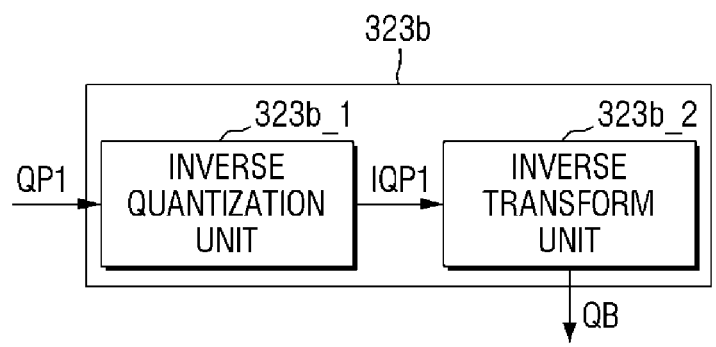
FIG. 11 is a block diagram for illustrating an inverse quantization module of FIG. 9 in detail.

FIG. 11 is a block diagram for illustrating the inverse quantization module of FIG. 9 in detail.

Referring to FIG. 11, the inverse quantization module 323b may include an inverse quantization unit 323b_1 and an inverse transform unit 323b_2.

The inverse quantization module 323b may inverse-quantize the first quantization coefficient QP1 to thereby generate an inverse quantization coefficient IQP1. The inverse transform unit 323b_2 may inversely transform the inverse quantization coefficient IQP1 to generate an inverse quantization block QB.

Figure 12:
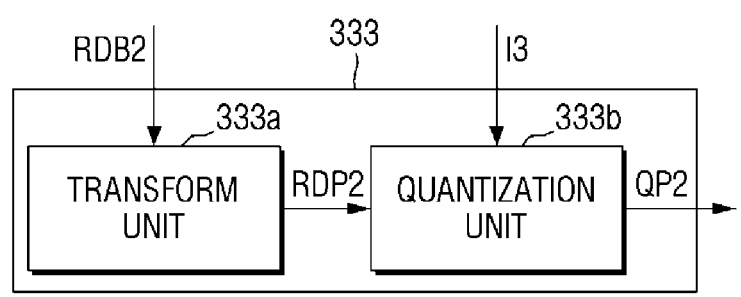
FIG. 12 is a block diagram for illustrating a second compression module of FIG. 8 in detail.

FIG. 12 is a block diagram for illustrating the second compression module of FIG. 8 in detail.

Referring to FIG. 12, the second compression module 333 may include a second transform unit 333a and a second quantization unit 333b. While the counterpart of the quantization module 323a of the first compression module 323 is included in the second compression module 333, the counterpart of the inverse quantization module 323b may not be included in the second compression module 333.

The second transform unit 333a may create the transformed block data from the second residual block RDB2. The second transform unit 333a may use discrete cosine transform (DCT) or wavelet transform. A second transform coefficient RDP2 generated in the second transform unit 333a may be transmitted to the second quantization unit 333b.

The second quantization unit 333b may quantize the second transform coefficient RDP2, according to the first quantization parameter data I3 determined by the first rate control module 322, and may output the second quantization coefficient QP2. The second quantization unit 333b may quantize the second transform coefficient RDP2 to reduce the number of bits. In doing so, the second quantization unit 333b may use the first quantization parameter data I3 of the first codec 320.

Figure 13:
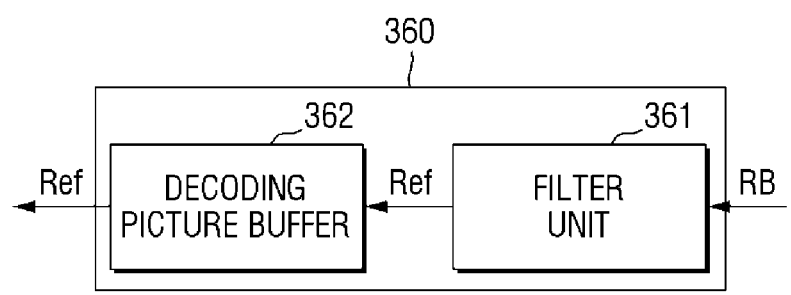
FIG. 13 is a block diagram for illustrating a reference module of FIG. 3 in detail.

FIG. 13 is a block diagram for illustrating the reference module of FIG. 3 in detail.

Referring to FIG. 13, the reference unit 360 may include a filter unit 361 and a decoding picture buffer 362.

The filter unit 361 may receive the reconstruction block RB. The filter unit 316 may apply any one or any combination of a deblocking filter, a sample adaptive offset (SAO) filter, and an adaptive loop filter (ALF) to the reconstruction block RB. The filter unit 361 may apply a filter to the reconstruction block RB to create reference data Ref.

The decoding picture buffer 362 may store the reference data Ref. The decoding picture buffer 362 may provide the reference data Ref when the motion estimation module 310 is to use it. In addition, the decoding picture buffer 362 may provide the reference data Ref when the first codec 320 is to use the reference data Ref.

In the first multi-codec encoding system 10 according to example embodiments, the two codecs, i.e., the first codec 320 and the second codec 330 share the single motion estimation module 310, such that the size of the device can be greatly reduced. Although the first multi-codec encoding system 10 includes only one motion estimation module 310, it can achieve performance comparable to that of an encoding system including two motion estimation modules by way of providing the first motion estimation information I1 on a frame processed in the first codec 320 to the second codec 330 by the motion estimation module 310.

Because a difference between the motion vectors of the adjacent frames is not significant in encoding images at a high frame rate, there is no problem to share the first motion estimation information I1.

Hereinafter, a multi-codec encoder according to example embodiments will be described with reference to FIGS. 14 and 15. Descriptions of the elements identical to those described above will not be made to avoid redundancy.

Figure 14:
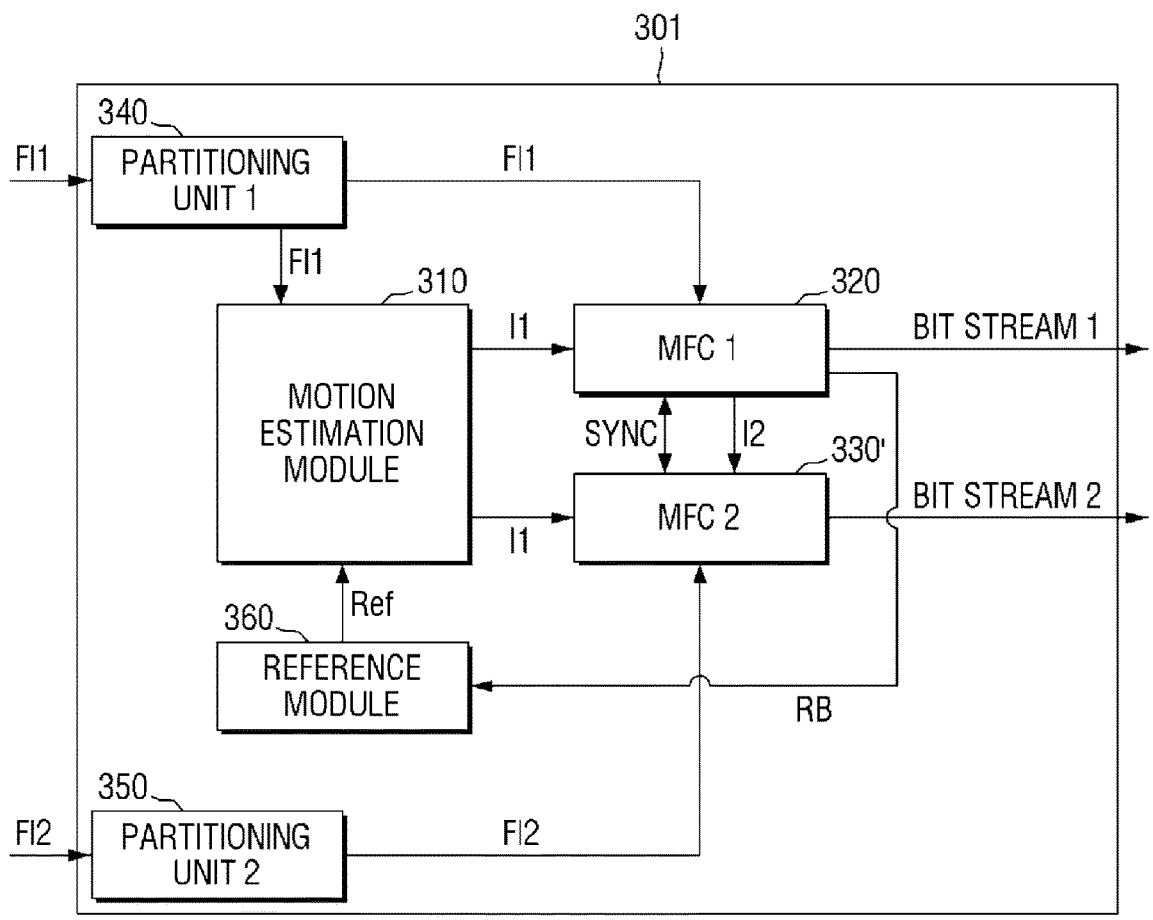
FIG. 14 is a block diagram of a multi-codec encoder according to example embodiments.

FIG. 14 is a block diagram of a multi-codec encoder according to example embodiments. FIG. 15 is a block diagram of a third codec of FIG. 14.

Referring to FIG. 14, a second multi-codec encoder 301 according to example embodiments includes a third codec 330' instead of the second codec 330 of FIG. 3.

The third codec 330' may not receive the first quantization parameter data I3 from the first codec 320.

Figure 15:
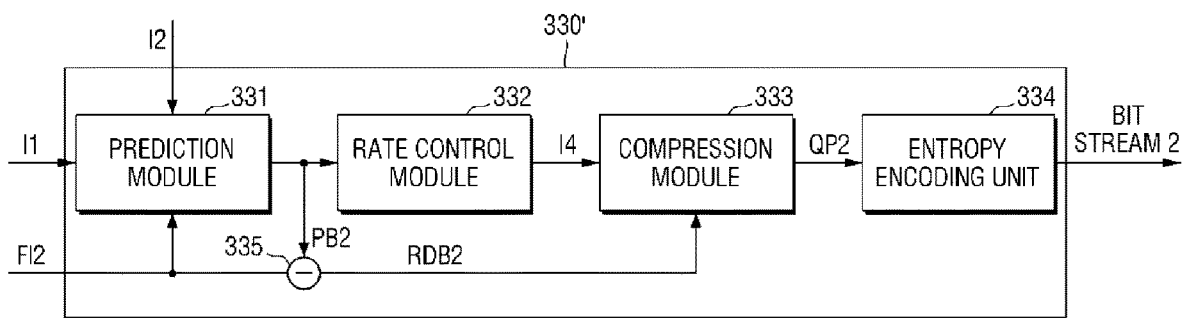
FIG. 15 is a block diagram of a third codec of FIG. 14.

Referring to FIG. 15, the third codec 330' may include a second rate control module 332.

The second rate control module 332 may adjust the quantization parameters of each of the plurality of blocks included in the current frame by using the second prediction block PB2. That is, the second rate control module 332 may generate the second quantization parameter data I4. The second rate control module 332 may transmit the second quantization parameter data I4 to the second codec 333.

The second compression module 333 may generate a second quantization coefficient QP2 by using the second quantization parameter data I4 instead of the first quantization parameter data I3.

Because the second multi-codec encoder 301 according to example embodiments includes the additional second rate control module 332 in the third codec 330', it can adjust the quantization on the second data FI2 more precisely. This is because the first quantization parameter data I3 generated in the first codec 320 is actually based on the first prediction block PB1 and thus may not be suitable for the second data FI2.

Hereinafter, a multi-codec encoder according to example embodiments will be described with reference to FIGS. 16 to 19. Descriptions of the elements identical to those described above will not be made to avoid redundancy. The multi-codec encoder according to example embodiments shown in FIGS. 16 to 19 has the same configuration as the multi-codec encoder according to example embodiments shown in FIGS. 1 to 15, except for the movement of internal data. Depending on the information input thereto, example embodiments shown in FIGS. 1 to 15 and example embodiments shown in FIGS. 16 to 19 may be alternatively practiced.

Figure 16:
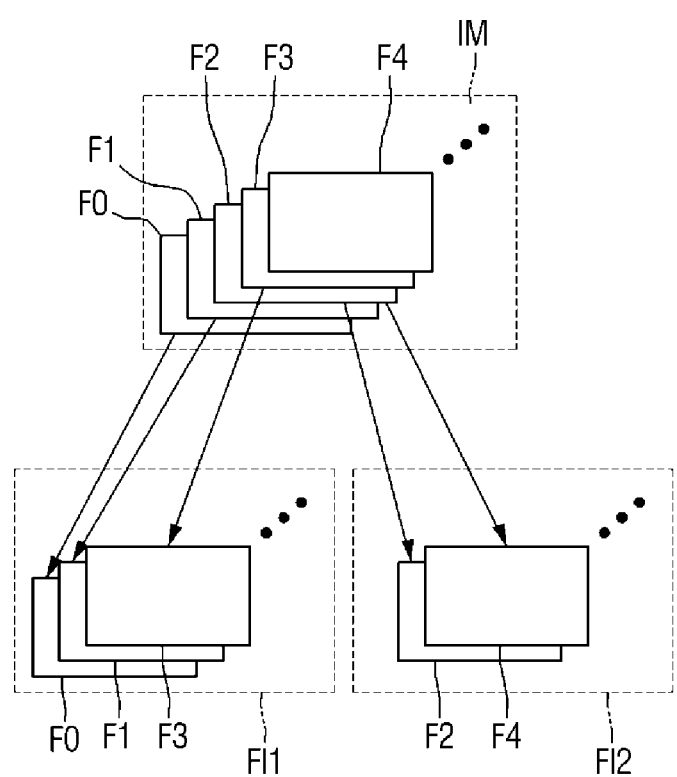
FIG. 16 is a diagram for conceptually illustrating classification of image data input to the multi-codec encoding system according to example embodiments.

FIG. 16 is a diagram for conceptually illustrating classification of image data input to the multi-codec encoding system according to example embodiments.

Referring to FIG. 16, for example, the image data IM may be a set of data including a plurality of frame data F0, F1, F2, F3 and F4. The first data FI1 may include a first frame F0, and odd-numbered frames (e.g., F1 and F3) excluding the first frame F0. The second data FI2 may include even-numbered frames (e.g., F2 and F4), excluding the first frame F0. It is, however, to be understood that this is illustrative.

Figure 17:
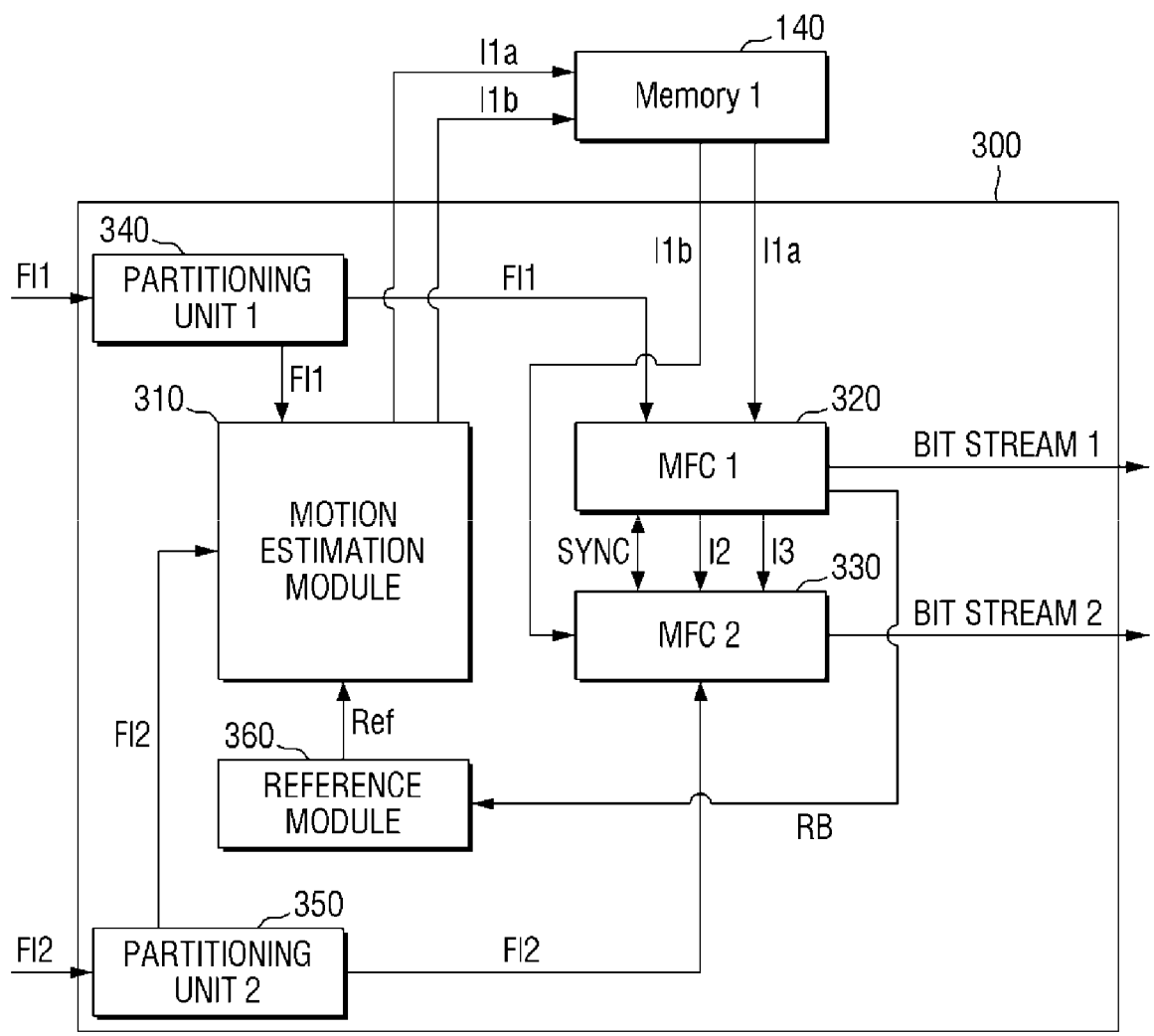
FIG. 17 is a block diagram of the multi-codec encoder according to example embodiments.

FIG. 17 is a block diagram of the multi-codec encoder according to example embodiments.

Referring to FIG. 17, the first multi-codec encoder 300 may exchange information with the first memory 140.

The second partitioning unit 350 of the first multi-codec encoder 300 may transmit the second data FI2 to the second codec 330 as well as to the motion estimation module 310.

The motion estimation module 310 may generate first motion estimation information I1a, using the first data FI1 and the reference data Ref. The first motion estimation information I1a may contain the motion vector. The motion estimation module 310 may store the first motion estimation information I1a in the first memory 140.

The motion estimation module 310 may generate second motion estimation information I1b, using the second data FI2 and the reference data Ref. The second motion estimation information I1b may contain the motion vector. The motion estimation module 310 may store the second motion estimation information I1b in the first memory 140.

The first memory 140 may transmit the first motion estimation information I1a to the first codec 320 and the second motion estimation information I1b to the second codec 330.

The first codec 320 may retrieve the first motion estimation information I1a from the first memory 140, while the second codec 330 may retrieve the second motion estimation information I1b from the first memory 140. The first codec 320 may encode the first data FI1, using the first motion estimation information I1, while the second codec 330 may encode the second data FI2, using the second motion estimation information I1b.

Figure 18:
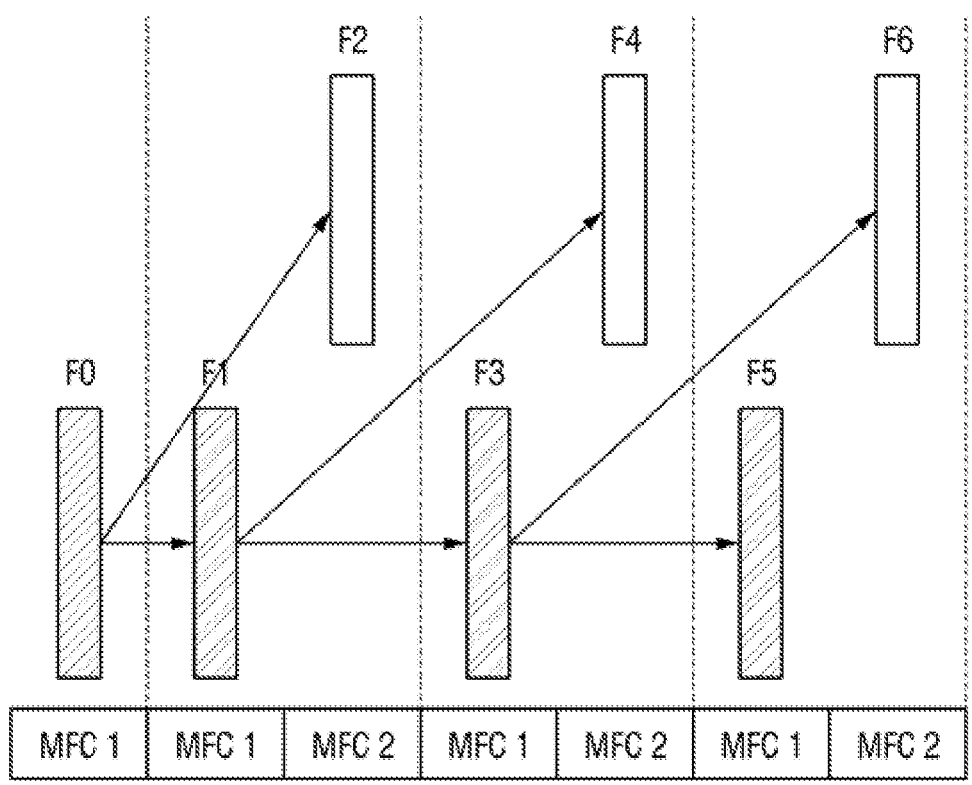
FIG. 18 is a diagram for conceptually illustrating encoding by the first and second codecs of FIG. 17.

FIG. 18 is a diagram for conceptually illustrating encoding by the first and second codecs of FIG. 17.

Referring to FIG. 18, the first frame F0 may be encoded by using intra-prediction by the first codec 320. Subsequently, the first frame F1 may be encoded by using inter-prediction by the first codec 320. The second frame F2 may be encoded by the second codec 330 by using inter-prediction. The first frame F1 may be utilized as the reference data Ref for the third frame F3 and the fourth frame F4. In this way, the encoding may proceed on the third to sixth frames F3 to F6.

Figure 19:
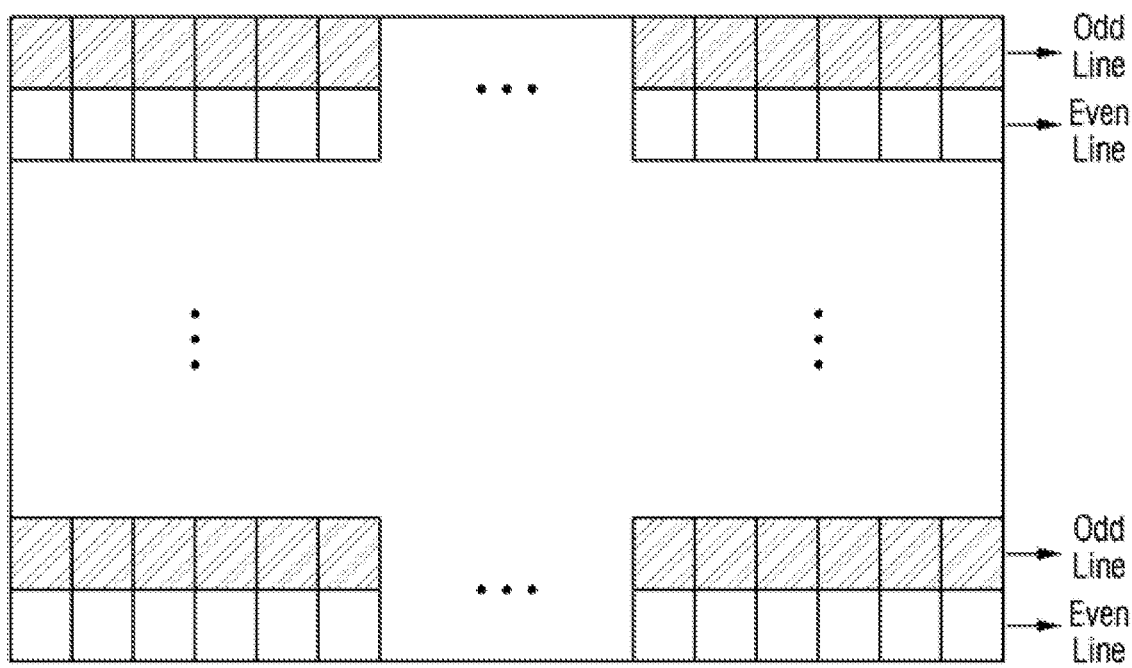
FIG. 19 is a diagram for illustrating a method of generating a motion vector by a motion estimation module of FIG. 17.

FIG. 19 is a diagram for illustrating a method of generating a motion vector by the motion estimation module of FIG. 17.

Referring to FIG. 19, the motion estimation module 310 may generate motion estimation information on a frame only with half of the blocks of the frame. For example, the motion estimation module 310 may generate the first motion estimation information I1a only with blocks of odd lines among the blocks of the first frame F1. Alternatively, the motion estimation module 310 may generate the first motion estimation information I1a only with blocks of even lines among the blocks of the first frame F1.

Likewise, the motion estimation module 310 may generate the second motion estimation information I1b only with blocks of odd lines or even lines among the blocks of the second frame F2.

Alternatively, the multi-codec encoder according to example embodiments may use only half of the lines of blocks of the frame in different manners. For example, assuming that there are thirty-two lines (first to thirty-second lines) in a frame, only the 1st to the 16th lines may be used while the 17th to 32nd lines are not used.

As the motion estimation module 310 in the first multi-codec encoder 300 according to example embodiments uses only half of the information on a frame, it is possible to utilize the two codecs, i.e., the first codec 320 and the second codec 330 only with the single motion estimation module 310 without waste.

That is, the motion estimation module 310 can quickly acquire the first motion estimation information I1a on the first frame F1 and store it in the first memory 140, and may quickly acquire the second motion estimation information I1b on the second frame F2, which is immediately next to the first frame F1 and store it in the first memory 140.

In accordance with this, while the first codec 320 retrieves the first motion estimation information I1 from the first memory 140 and encodes it, the second codec 330 may retrieve the second motion estimation information I1b from the first memory 140 to start to encode it. In this manner, the first multi-codec encoder 300 according to example embodiments can achieve twice the speed achieved by one motion estimation module and one codec, by using the one motion estimation module 310 and the two codecs.

As a result, the space can be saved by the size of one motion estimation module while maintaining the performance comparable to that of a device equipped with two motion estimation modules and two codecs, and thus the overall size of the device can be reduced.

Because pixels are finely divided in a signal image of high-definition images, there may be no significant problem in the accuracy of motion vectors and motion estimation information even if the motion estimation module 310 uses only half of the frame.

Accordingly, the first multi-codec encoder 300 according to example embodiments can achieve comparable performance with a smaller device.

Hereinafter, a multi-codec encoding system according to example embodiments will be described with reference to FIGS. 20 and 21. Descriptions of the elements identical to those described above will not be made to avoid redundancy.

Figure 20:
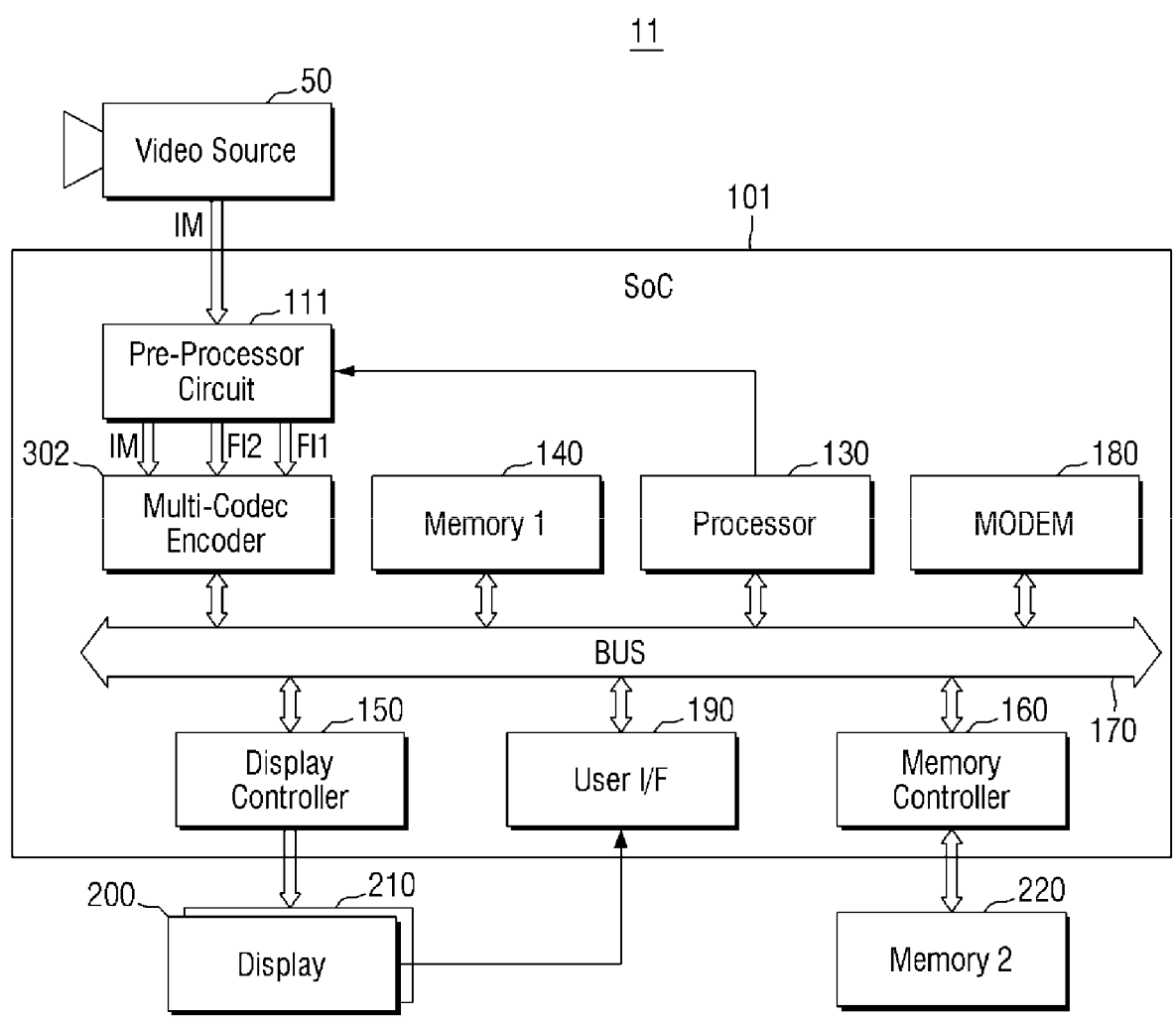
FIG. 20 is a block diagram of a multi-codec encoding system according to example embodiments.

FIG. 20 is a block diagram of a multi-codec encoding system according to example embodiments. FIG. 21 is a block diagram for illustrating a multi-codec encoder of FIG. 20 in detail.

Referring to FIG. 20, a second multi-codec encoding system 11 according to example embodiments may include a second multi-codec encoding device 101 including a second pre-processor circuit 111 and a third multi-codec encoder 302.

The second pre-processor circuit 111 may receive the image data IM output from the video source 50. The second pre-processor circuit 111 may process the received image data IM and may provide the image data IM, the first data FI1 and the second data FI2 thus generated to the third multi-codec encoder 302.

Figure 21:
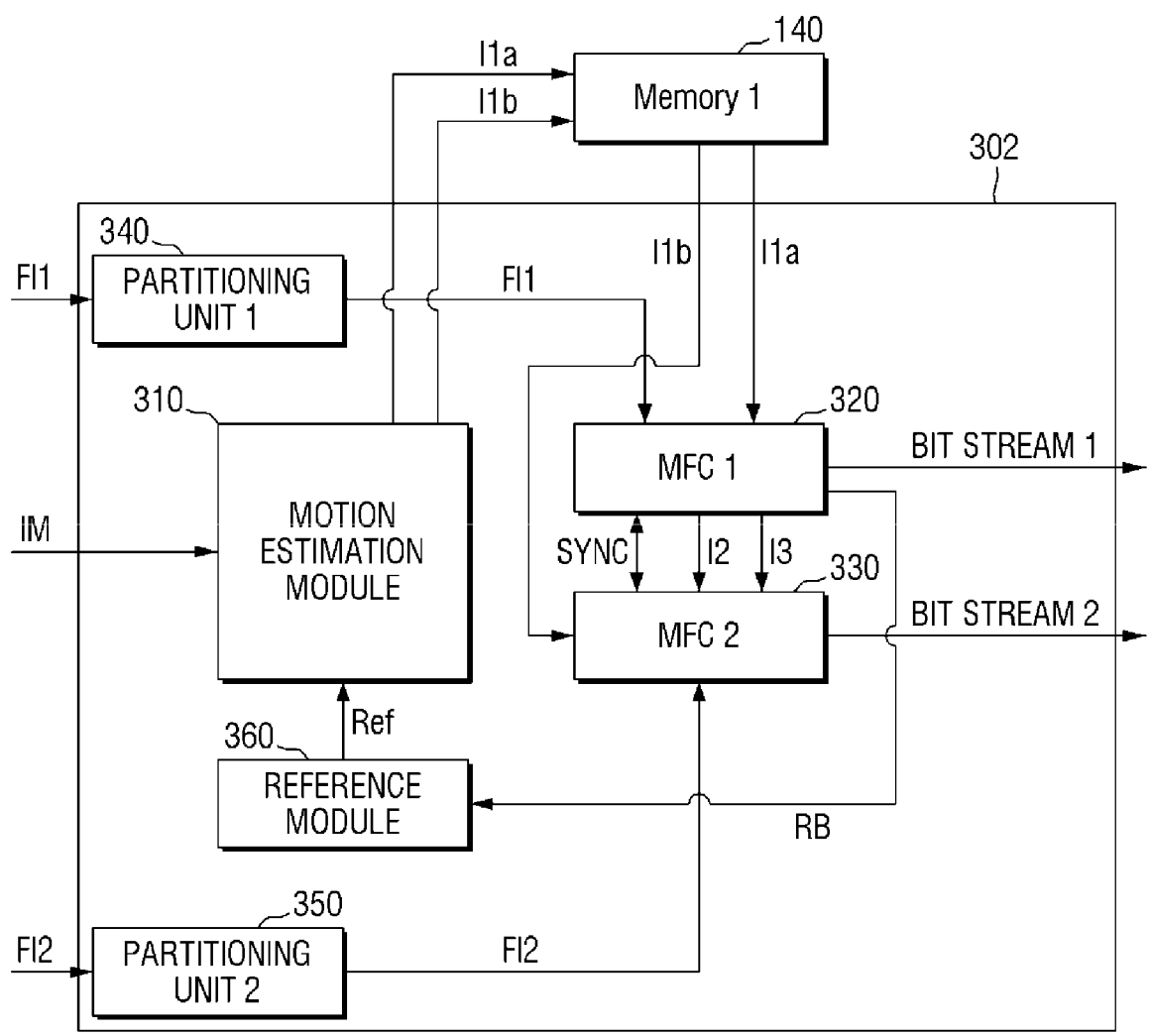
FIG. 21 is a block diagram for illustrating a multi-codec encoder of FIG. 20 in detail.

Referring to FIG. 21, the motion estimation module 310 of the third multi-codec encoder 302 may receive the image data IM from the second pre-processor circuit 111.

The first partitioning unit 340 may transmit the first data FI1 to the first codec 320 but may not transmit the first data FI1 to the motion estimation module 310. The second partitioning unit 350 may transmit the second data FI2 to the second codec 330 but may not transmit the second data FI2 to the motion estimation module 310.

The third multi-codec encoder 302 according to example embodiments does not receive the first data FI1 and the second data FI2 divided from the first partitioning unit 340 and the second partitioning unit 350 but directly receives the image data IM from the second pre-processor circuit 111. Therefore, it does not require an operation logic to merge the first data FI1 and the second data FI2 or process them alternately.

As a result, the motion estimation module 310 according to example embodiments can achieve better performance and speed with a relatively low amount of computation.

As is traditional in the field of the inventive concepts, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of example embodiments may be physically separated into two or more interacting and discrete blocks, units and/or modules without departing from the scope of the inventive concepts. Further, the blocks, units and/or modules of example embodiments may be physically combined into more complex blocks, units and/or modules without departing from the scope of the inventive concepts.

The various operations of methods described above may be performed by any suitable means capable of performing the operations, such as various hardware and/or software component(s), circuits, and/or module(s).

The software may include an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the present inventive concept has been shown and described with reference to example embodiments thereof, it will be understood by those of ordinary skill in the art that various changes in form and details may be made therein without departing from the spirit and scope of the present inventive concept as defined by the following claims. It is therefore desired that example embodiments be considered in all respects as illustrative and not restrictive, reference being made to the appended claims rather than the foregoing description to indicate the scope of the invention.

What is claimed is:

1. A multi-codec encoder comprising:
a processor implementing:

a first partitioning unit and a second partitioning unit configured to receive first data and second data, respectively, wherein an initial frame, a first frame, a second frame, a third frame and a fourth frame of image data are sequential, the first frame and the third frame are classified into the first data, and the second frame and the fourth frame are classified into the second data;

a motion estimation module configured to generate first motion estimation information, based on the third frame with the first frame as reference data and to generate second motion estimation information based on the second frame with the initial frame as the reference data;

a first codec configured to encode the third frame with the first motion estimation information generated based on the third frame and the first frame; and a second codec configured to encode the second frame with the first motion estimation information generated based on the third frame and the first frame and to encode the second frame with the second motion estimation information generated based on the second frame and the initial frame.

2. The multi-codec encoder of claim 1, wherein the first codec is further configured to generate a reconstruction block of the third frame, and wherein the processor further implements a reference module configured to generate the reference data, based on the generated reconstruction block, and transmit the generated reference data to the motion estimation module.

3. The multi-codec encoder of claim 1, wherein the first codec comprises:

a first prediction module configured to generate a first prediction block, based on the third frame and the generated first motion estimation information, and generate intra-prediction information, based on the first frame;

a first subtractor configured to derive a first difference between the generated first prediction block and the third frame, as a first residual block; and a first compression module configured to quantize the first residual block.

4. The multi-codec encoder of claim 3, wherein the first prediction module comprises:

a motion compensation unit configured to perform inter-prediction on the third frame, based on the generated first motion estimation information;

an intra-prediction unit configured to perform intra-prediction on the first frame, to generate the intra-prediction information; and a switch configured to selectively connect, to the first subtractor, the motion compensation unit and the intra-prediction unit, to generate the first prediction block.

5. The multi-codec encoder of claim 3, wherein the first codec further comprises a first rate control module configured to generate first quantization parameter data, based on the generated first prediction block, and transmit the generated first quantization parameter data to the first compression module.

6. The multi-codec encoder of claim 5, wherein the first rate control module is further configured to transmit the generated first quantization parameter data to the second codec.

7. The multi-codec encoder of claim 3, wherein the second codec comprises:

a second prediction module configured to generate a second prediction block, based on the second frame, the generated first motion estimation information and the generated intra-prediction information;

a second subtractor configured to derive a second difference between the generated second prediction block and the second frame, as a second residual block; and a second compression module configured to quantize the second residual block.

8. The multi-codec encoder of claim 7, wherein the second codec further comprises a second rate control module configured to generate second quantization parameter data, based on the generated second prediction block, and transmit the generated second quantization parameter data to the second compression module.

9. The multi-codec encoder of claim 1, wherein the first codec and the second codec perform hierarchical encoding.

10. The multi-codec encoder of claim 9, wherein the hierarchical encoding comprises a five-layer scheme or a seven-layer scheme.

11. The multi-codec encoder of claim 1, wherein the initial frame of the image data is classified into the first data, and wherein the multi-codec encoder further comprises a memory configured to store the generated first motion estimation information and the generated second motion estimation information, and transmit the generated first motion estimation information and the generated second motion estimation information to the first codec and the second codec, respectively.

12. The multi-codec encoder of claim 11, wherein the motion estimation module is further configured to generate the first motion estimation information, using only half of blocks of the first frame.

13. The multi-codec encoder of claim 11, wherein the motion estimation module is further configured to generate the first motion estimation information, using only odd lines or even lines of blocks of the first frame.

14. A multi-codec encoding system comprising:

a pre-processor circuit configured to classify an initial frame, a first frame and a third frame of image data into first data, and classify a second frame and a fourth frame of the image data into second data, wherein the first frame, the second frame, the third frame and the fourth frame are sequential; and a processor implementing a multi-codec encoder configured to receive the first data and the second data, and comprising:

a motion estimation module configured to generate first motion estimation information based on the third frame with the first frame as reference data and to generate second motion estimation information based on the second frame with the initial frame as the reference data;

a first codec configured to encode the third frame with the first motion estimation information generated based on the third frame and the first frame; and a second codec configured to encode the second frame with the first motion estimation information generated based on the third frame and the first frame and to encode the second frame with the second motion estimation information generated based on the second frame and the initial frame.

15. The multi-codec encoding system of claim 14, wherein the first codec is further configured to generate intra-prediction information, based on the first frame, and wherein the second codec is further configured to receive the intra-prediction information from the first codec.

16. The multi-codec encoding system of claim 14, wherein the second codec is further configured to scale the generated first motion estimation information, and encode the second frame with the scaled first motion estimation information.

17. The multi-codec encoding system of claim 14, wherein the initial frame of the image data is sequentially prior to the first frame,
wherein the multi-codec encoding system further comprises a memory configured to store the generated first motion estimation information and the generated second motion estimation information, and transmit the generated first motion estimation information and the generated second motion estimation information to the first codec and the second codec, respectively, and
wherein each of the first motion estimation information and the second motion estimation information is generated using only half of blocks of a single frame of a respective one of the first frame and the initial frame.

18. A multi-codec encoder comprising:
a processor implementing:
a first partitioning unit and a second partitioning unit configured to receive first data and second data, respectively, wherein an initial frame, a first frame, a second frame, a third frame and a fourth frame of image data are sequential, the initial frame, the first frame and the third frame are classified into the first data, and the second frame and the fourth frame are classified into the second data; and
a motion estimation module configured to:
generate first motion estimation information based on the third frame with the first frame as reference data; and
generate second motion estimation information based on the second frame and the initial frame as the reference data,
wherein each of the first motion estimation information and the second motion estimation information is generated using only half of a single frame of a respective one of the first frame and the initial frame; and
a memory configured to store the generated first motion estimation information and the generated second motion estimation information,
wherein the processor further implements:
a first codec configured to encode the third frame with the first motion estimation information generated based on the third frame and the first frame; and
a second codec configured to encode the second frame with the second motion estimation information generated based on the second frame and the initial frame.

19. The multi-codec encoder of claim 18, wherein each of the first motion estimation information and the second motion estimation information is generated using only odd lines or even lines of the single frame.

* * * * *